United States Patent [19]

Fima

[11] 3,888,156
[45] June 10, 1975

[54] ANCHOR BOLT CONSTRUCTION
[76] Inventor: Raoul Fima, 655 West Diversey, Lisle, Ill. 60101
[22] Filed: Mar. 29, 1974
[21] Appl. No.: 455,995

[52] U.S. Cl............................................. 85/71; 85/70
[51] Int. Cl........................................... F16b 13/06
[58] Field of Search............ 85/71, 70, 66, 3 S, 3 K, 85/3 R

[56] References Cited
UNITED STATES PATENTS
| 2,562,336 | 7/1951 | Selden | 85/70 |
|---|---|---|---|
| 3,304,829 | 2/1967 | Raynovich | 85/70 |
| 3,316,796 | 5/1967 | Young | 85/71 |

FOREIGN PATENTS OR APPLICATIONS
| 212,600 | 7/1956 | Australia | 85/71 |
|---|---|---|---|
| 512,884 | 2/1955 | Italy | 85/71 |
| 38,137 | 1/1915 | Sweden | 85/3 R |

Primary Examiner—Marion Parsons, Jr.
Attorney, Agent, or Firm—Edmond T. Patnaude

[57] ABSTRACT

The body portion of an anchor is provided at the outer end thereof with an internal thread having a minimum internal diameter greater than the minor diameter of the internal thread at the inner end of the bolt whereby the collapsed intermediate portion of the anchor bolt may be straightened out for removal from the wall in which it is mounted.

6 Claims, 4 Drawing Figures

PATENTED JUN 10 1975　　　　　　　　　　　　　3,888,156

ANCHOR BOLT CONSTRUCTION

SPECIFICATION

The present invention relates in general to anchor bolts, and it relates more particularly to an improved anchor bolt construction of the type having a collapsible body sleeve and incorporating means for elongating the body sleeve of the bolt after it has been mounted to a wall and compressed against the inner surface thereof.

BACKGROUND OF THE INVENTION

The use of anchor bolts for mounting objects to the outer surface of hollow walls is well known. One such bolt includes a body portion in the form of a collapsible sleeve having an external annular flange at the outer end and an internally threaded nut fixedly secured to the inner end of the sleeve. In use, the body sleeve is inserted in a hole in the wall so as to extend a substantial distance inwardly from the inner face of the wall with the collapsible portion of the body located behind the wall. A headed machine screw is then inserted into the body and threaded into the nut mounted at the inner end thereof. As the screw is tightened with the head thereof abutting the flange at the outer end of the body sleeve a compressive force is exerted between the two ends of the sleeve to cause the collapsible portion of the sleeve to collapse outwardly against the inner face of the wall thereby to secure the body sleeve firmly in place in the wall panel.

Removal of such bolts from the wall to which they are mounted has, in the past, only been possible by pushing the bolt through the wall so that it falls down on the inner side thereof or by pulling it out of the wall. In either case the wall is almost always damaged. Since, however, it is frequently desirable to remove anchor bolts from the walls in which they are mounted it would be desirable to incorporate means in such a bolt to facilitate removal thereof without damage to the wall.

SUMMARY OF THE INVENTION

Briefly, the aforesaid object of the present invention may be realized by providing the aforesaid conventional anchor bolt with an internal thread at the outer end of the body sleeve, the minimum internal diameter of which thread is greater than the maximum external diameter of the threaded portion of the screw which meshes with the internally threaded inner end of the body. Accordingly, when the bolt is being initially mounted to the wall in the conventional manner, the screw freely extends through the outer end as though the outer thread did not exist. However, after the body sleeve has been mounted to the wall with the collapsible portion compressed against the rear surface of the wall, the body sleeve can be removed from the wall by first removing the original screw and then inserting a second screw of larger diameter which meshes with the thread at the outer end of the body sleeve. As this second screw is tightened through the outer thread the inner end of the screw abuts against the end of the nut at the inner end of the sleeve and continued rotation of the screw exerts a tensile force between the two ends of the sleeve thereby to elongate the previously collapsed intermediate portion to substantially its original condition whereby its outer diameter is no greater than that of the hole through which it was originally inserted whereby it can be readily retracted through that original hole in the wall.

BRIEF DESCRIPTION OF THE DRAWINGS

Further objects and advantages and a better understanding of the invention may be had from the following detailed description taken in connectionn with the accompanying drawings, wherein.

DETAILED DESCRIPTION OF THE INVENTION

Figure 1:
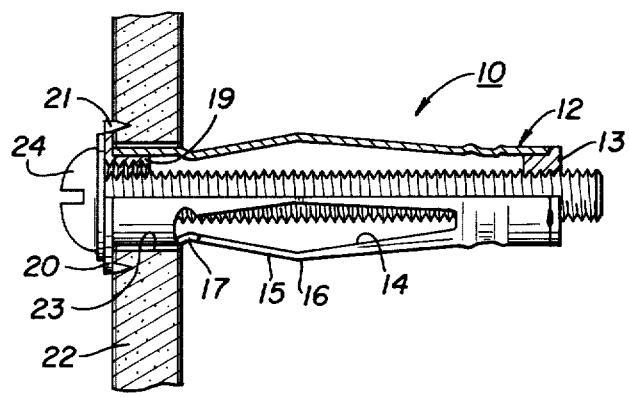
FIG. 1 is a partially sectioned view of an anchor bolt embodying the present invention inserted in a hole in the wall in the process of being mounted thereto.
Figure 2:
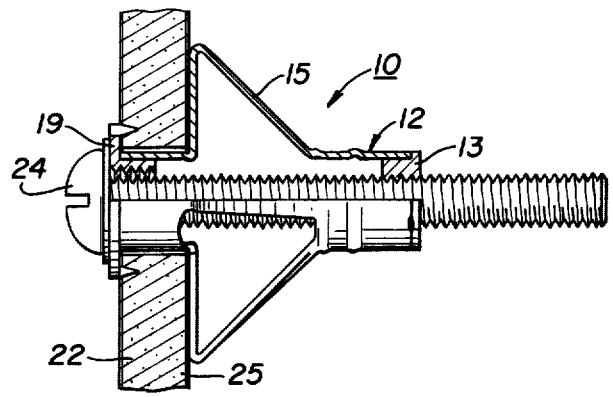
FIG. 2 is a cross sectional view showing the molly bolt of FIG. 1 firmly mounted to the wall.
Figure 3:
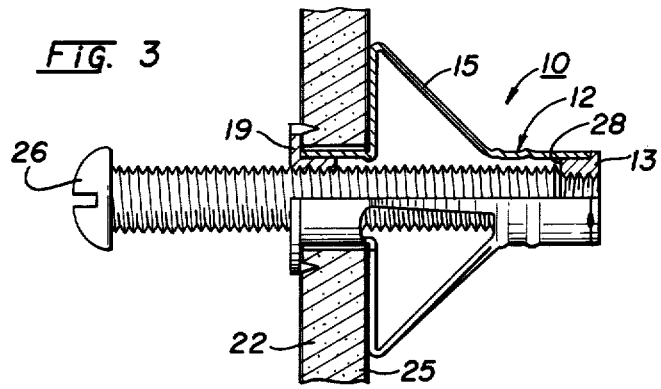
FIG. 3 shows the molly bolt of FIGS. 1 and 2 in the mounted position just prior to removal thereof from the wall.

Referring to FIG. 1, an anchor bolt 10 has a body sleeve portion 12 of generally tubular shape having an internally threaded nut 13 fixedly secured in the inner end thereof. A plurality of longitudinally extending slots 14 are provided in the intermediate portion of the body sleeve 12 to define a plurality of longitudinal ribs 15 having a minimum circumferential width at the location 16 and which are also necked down at 17 to provide areas of weakness at the locations 16 and 17. An internally threaded nut 19 is fixedly secured as by welding in the outer end of the sleeve 12 and includes an external annular flange 20 provided with a plurality of prongs 21 which extend into a wall 22 to which the bolt 10 is to be assembled to prevent rotation of the bolt in the wall. The inner surface of the flange 20 is spaced from the necked down weakened area 17 of the body sleeve by a distance substantially equal to the thickness of the wall 22 in which the bolt is mounted. After the body sleeve has been inserted through a hole 23 in the wall 22 a headed machine screw 24 whose thread mates with the internal thread of the nut 13 is then rotated by means of a screwdriver or the like exert a compressive force between the flange 19 and the nut 13 to cause the nut 13 and thus the inner end of the body sleeve 12 to be moved toward the flange 20 and thus toward the rear face of the wall 22. The compressive force which is thus exerted on the sleeve 12 between the flange 20 and the nut 13 causes the ribs 15 to bend at the areas of weakness 16 and 17 so that continued screwing of the screw 24 into the nut 13 eventually results in the portion of the ribs 15 between the locations 16 and 17 being forced tightly against the rear face 25 of the wall 22 as shown in FIGS. 2 and 3. As shown in the drawings, the maximum internal diameter of the integral thread in the nut 19 is greater than the maximum external diameter of the screw 24. In other words, the major diameter of the threads in the nut 19 is greater than the minor diameter of the thread in the nut 13. Consequently, the screw 24 extends through the outer nut 19 without any interference whatever as though the threads of the nut 19 did not exist.

Figure 4:
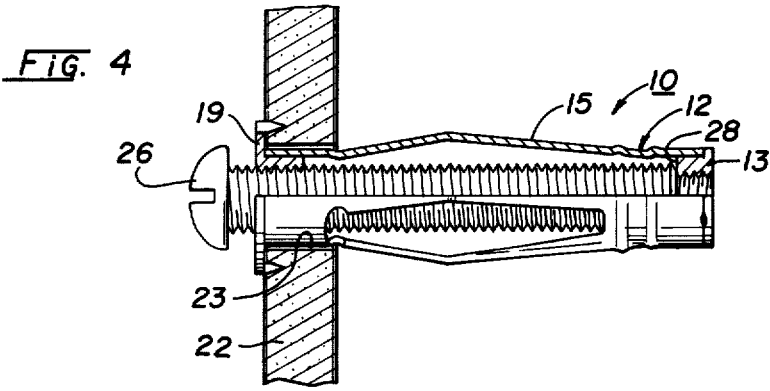
FIG. 4 is a cross sectional view of the bolt of FIG. 3 after the body sleeve portion has been elongated for removal from the wall.

In order to remove the anchor bolt body sleeve 12 from the wall after it has been mounted thereto with the intermediate collapsible portion positioned against the inner face 25 of the wall as shown in FIGS. 2 and 3, the screw 24 is removed and a second screw 26 having a larger diameter than that of the screw 24 and whose thead meshes with the internal thread in the nut 19 is then threaded through the nut 19 so that the inner end of the screw 26 abuts the inner face 28 of the nut 13 as shown in FIG. 3. As the screw 26 is then threaded through the outer nut 19 a tensile force is exerted between the nuts 19 and 13 and thus on the body sleeve 12 thereby to elongate the body sleeve 12 until the ribs 15 thereof are returned to substantially their original shape as shown in FIG. 4. The entire molly bolt assembly can then be retracted through the hole 23 through which it was initially inserted into the wall 22 without substantially damaging the wall.

While the present invention has been described in connection with a particular embodiment thereof, it will be understood that those skilled in the art may make many changes and modifications without departing from the true spirit and scope thereof. Accordingly, the appended claims are intended to cover all such changes and modifications as fall within the true spirit and scope of the present invention.

What is claimed is:

1. A removable anchor bolt for mounting to a hollow wall, comprising a sleeve-like body having an external flange at one end, an internally threaded nut positioned at the other end of said body, said body having an internal thread in proximity to said one end, the root diameter of said internal thread exceeding the root diameter of the thread in said nut and the minimum diameter of said external thread exceeding the root diameter of the thread in said nut said body having a portion disposed between said internal thread and said nut which collapses radially outward in response to a compressive force exerted between said flange and said nut against the interior surface of a wall in which said anchor is disposed, and the minimum internal cross-sectional dimension of said body being no less than the root diameter of said internal thread, said body having an internal opening after said portion is collapsed against said wall which is no less than the root diameter of said internal thread, whereby a screw mating with said internal thread can be threaded through said one end to engage said nut and stretch said body to reduce its external diameter to substantially its original size to permit removal of the anchor from a wall.

2. An anchor bolt according to claim 1 wherein said internal thread is provided in a nut fixed to the outer end portion of said body sleeve.

3. An anchor bolt according to claim 2 wherein is provided means extending from said flange toward said inner end of said body sleeve for engagement with said wall to prevent relative rotation between said body sleeve and said wall.

4. An anchor bolt according to claim 3 wherein said last named nut comprises an annular flange overlying the outer end of said body sleeve and extending outwardly therefrom.

5. An anchor bolt according to claim 4 wherein said collapsible portion of said body sleeve comprises a plurality of longitudinally extending ribs.

6. An anchor bolt according to claim 5 comprising a screw having a thread meshing with said internal thread, the inner end of said screw being larger in external diameter than the root diameter of said nut, and the threads of said screw not meshing with the threads of said nut.

* * * * *